United States Patent
Duerbaum

(10) Patent No.: US 6,653,822 B2
(45) Date of Patent: Nov. 25, 2003

(54) CIRCUIT FOR CONVERTING AC VOLTAGE INTO DC VOLTAGE

(75) Inventor: Thomas Duerbaum, Langerwehe (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/080,157

(22) Filed: Feb. 20, 2002

(65) Prior Publication Data
US 2002/0154525 A1 Oct. 24, 2002

(30) Foreign Application Priority Data

Feb. 22, 2001 (DE) ............................ 101 08 431
May 30, 2001 (DE) ............................ 101 26 160

(51) Int. Cl.[7] .......................... G05F 1/70; H02M 3/24
(52) U.S. Cl. .......................... 323/207; 363/98; 323/208
(58) Field of Search ........................ 323/222, 205, 323/207, 208, 211, 210, 282, 284; 363/89, 126, 81, 44, 16, 47, 48, 143, 124, 98, 132, 17

(56) References Cited

U.S. PATENT DOCUMENTS

| 4,268,899 A | * | 5/1981 | Rokas | 363/61 |
| 4,412,277 A | * | 10/1983 | Mitchell | 363/81 |
| 4,831,508 A | * | 5/1989 | Hunter | 363/44 |
| 5,113,337 A | * | 5/1992 | Steigerwald | 363/98 |
| 5,383,109 A | * | 1/1995 | Maksimovic et al. | 323/222 |
| 5,614,810 A | * | 3/1997 | Nostwick et al. | 323/207 |

OTHER PUBLICATIONS

Electromagnetic Compatibility (EMC) CEI/IEC 61000-3-2, Second Edition, 2000-08 May be Mentioned, Which is to be Satisfied in Europe as from the Year 2001 by Terminal Devices that have a Power Consumption Exceeding 75 W.

* cited by examiner

*Primary Examiner*—Rajnikant B. Patel
(74) *Attorney, Agent, or Firm*—Edward W. Goodman

(57) ABSTRACT

A circuit for converting AC voltage into DC voltage for one or two devices (Rm, Ra), includes a first part of the current being fed to the input side via a large induction coil (L50) and a first rectifier (Gm), and a second part of the current being fed via a second rectifier (Ga) upstream of the large induction coil. On the output side, behind the second rectifier (Ga), a switched-mode power supply is arranged, preferably in the form of an up-converter or a flyback converter (10). The division of the applied current for smoothing the output voltage provides that the induction coil (L50) can be accordingly dimensioned smaller and, despite this, the circuit can also satisfy relevant standard specifications.

4 Claims, 3 Drawing Sheets

CIRCUIT FOR CONVERTING AC VOLTAGE INTO DC VOLTAGE

BACKGROUND OF THE INVENTION

1. Field of the Invention

The invention relates to a circuit for converting AC voltage into DC voltage for at least one device, comprising two external input terminals for supplying an AC voltage, a rectifier module having two inputs connected via connection lines to the two external input terminals, and two output lines with external output terminals for coupling to the at least one device, and at least one induction coil coupled in at least one of the connection lines between the external input terminals and the rectifier module.

2. Description of the Related Art

Many electric or electronic devices need a DC voltage for their operation, this DC voltage being made available or generated, respectively, from the AC voltage of the electric line voltage. A television set (TV) is an example of such a terminal device. The circuits for converting AC voltage into DC voltage installed in such devices need to satisfy certain requirements with regard to their conversion behavior, particularly, with regard to the remaining portion of the network harmonics. Such requirements are known, more particularly, from the subject matter of standards, for which, especially, CEI/IEC 61000-3-2, SECOND EDITION, 2000-08 may be mentioned, which is to be satisfied in Europe as from the year 2001 by devices that have a power consumption exceeding 75 W.

To guarantee that the quality standards are adhered to, there are various possibilities with various optimal power ranges. Active solutions are predominant for large powers of about 500 W and upwards. In the range of smaller powers, on the other hand, often 50 Hz coils are found. They are comparatively inexpensive, but also comparatively large and heavy. This size or this concentrated volume, respectively, leads to problems with the available space on printed circuit boards or to problems with shock resistance of the manufactured devices.

These problems particularly occur in applications which contain more than one switched-mode power supply. An example of this is formed by modern TV sets in which a second power supply is necessary for standby operation and, in normal operation, supplies power to the logic ICs.

SUMMARY OF THE INVENTION

With the above in mind, it is an object of the present invention to provide a circuit for converting AC voltage into DC voltage for at least one device, this circuit guaranteeing sufficient quality of the conversion with limited required space and expenditure, and being particularly suitable for applications having two switched-mode power supplies.

This object is achieved by a circuit described above, characterized in that the circuit comprises at least a second rectifier module having two inputs each connected to one of the external input terminals while bypassing the induction coil, and two output lines for connecting to the at least one device, the output lines including a switched-mode power supply arranged between the second rectifier module and the device to be connected.

The circuit for converting AC voltage into DC voltage for at least one device accordingly comprises the following component parts:

(a) Two external input terminals (EA) to which the poles of an external AC voltage source can be connected.

(b) A rectifier module of known structure having two inputs connected to one of the external input terminals via connecting lines, and two output lines for connecting to at least one device.

(c) At least one induction coil arranged in one of the connecting lines connecting the external input terminals to the rectifier module. The induction coil leveling the recharging current or reducing the harmonic part of the recharging current, respectively.

The circuit is characterized in that at least a second rectifier module is present having two inputs connected to a respective external input terminal without an induction coil being arranged in the associated connecting line. Furthermore, the rectifier module has two output lines for connecting to at least one device. A switched-mode power supply with a respective drive is then arranged, for this purpose, in the output lines, this switched-mode power supply having at least a substantially sinusoidal input current. This means that the input current has a small harmonic part. Such power supplies, which are also called AC/DC converter or PFC (Power Factor Correction circuit), are known from the literature (compare Siemens "Schaltnetzteile" W. Hirschmann, A.Hauenstein, 1990, ISBN 3-800-1550-2, chapters 6.1 to 6.3).

In the circuit according to the invention, the power supplied from the exterior as AC voltage is led over two separate inputs paths. One path leads via the first rectifier module. This path includes, in known manner, an induction coil for effecting a reduction of the harmonic part of the recharging current. In addition, according to the invention, a second input path is provided via the second rectifier module. The consequent relief of the first input path when the total power consumption remains the same, may be used for, accordingly, arranging smaller induction coils in this path, because the necessary inductance can be chosen smaller. In this way, it becomes possible to use induction coils of drastically reduced size which can also be used when there is limited space on printed circuit boards and to avoid problems with the shock resistance of the devices. Furthermore, the pattern of the power consumption from the AC voltage source, this pattern being caused by the circuit according to the invention, is modified in an advantageous manner, so that standard specifications can be satisfied in simple fashion at reduced cost.

Whereas, basically, different topologies can be used for the switched-mode power supply, this power supply is preferably arranged so that it can be operated with a sinusoidal current. For this purpose, preferably an up-converter (also called boost converter or forward gain controller) and/or a flyback converter are used, for contrary to many other topologies, the up-converter and the flyback converter can generate a purely sinusoidal input current when accordingly driven in a "normal" fashion.

As an alternative, the switched-mode power supply (for example up-converter or flyback converter) can also be operated not to generate a purely sinusoidal input current, but to use the recharging pulse to keep the input current tapped from the external terminals sinusoidal as long as possible.

The circuit according to the invention may be complemented in various ways to obtain improved output signals. For example, the two output lines of the first rectifier module may be coupled each via a smoothing capacitor. This smoothing capacitor provides a suppression of higher frequencies in the output voltage.

The coupling via the output capacitor of the switched-mode power supply (for example, of the up-converter or flyback converter) takes place in the second output path.

BRIEF DESCRIPTION OF THE DRAWINGS

These and other aspects of the invention are apparent from and will be elucidated, by way of non-limitative example, with reference to the embodiment(s) described hereinafter, wherein, in the drawings.

DESCRIPTION OF THE PREFERRED EMBODIMENTS

The generation of DC voltages for supplying power to electronic terminal devices from an AC line current is to satisfy certain minimum requirements with regard to the conversion of the AC voltage into DC voltage. For devices consuming more than 75 W, these requirements are expressed, for example, in the intended standard CEI/IEC 61000-3-2, SECOND EDITION, 2000-08. Various methods of satisfying this standard are about generating as exact a sinusoidal input current as possible. Nevertheless, such a sinusoidal form is not absolutely prescribed by the standard.

A widely used method of satisfying quality standards consists of a passive solution via a so-called 50 Hz coil which smoothes the input current. However, a high inductance is then required to satisfy, for example, the CEI/IEC 61000-3-2, SECOND EDITION, 2000-08. The respective coil is thus very large and heavy, which causes problems when accommodating it on a printed circuit board and also during shock tests of the devices. The present invention enables a circuit which makes the use of smaller coils possible while simultaneously satisfying the quality specifications for the conversion.

Figure 1:
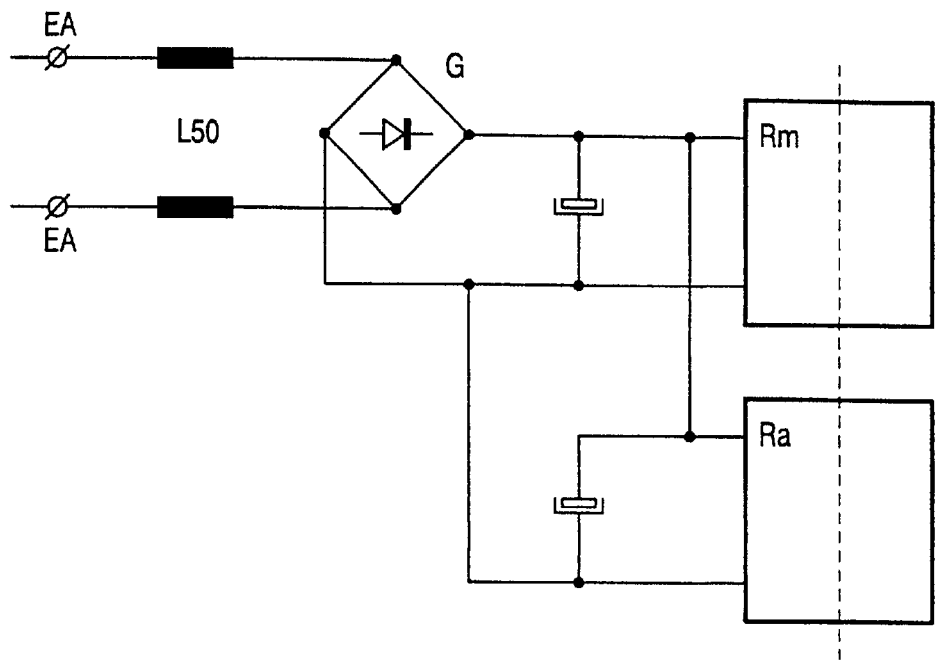
FIG. 1 shows a known circuit for supplying power to two devices.

FIG. 1 shows a known circuit for supplying a DC voltage to two devices Rm, Ra, this DC voltage being the result of a conversion from an AC voltage source. This circuit corresponds to that of FIG. 2 in which the two devices Rm, Ra are connected in parallel to the output circuit of the rectifier module G.

Figure 2:
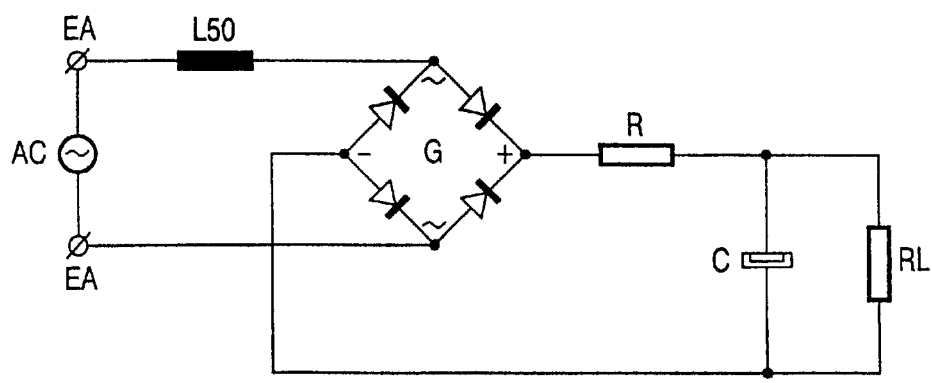
FIG. 2 shows another known circuit for supplying power to one device.

FIG. 2 shows a more detailed picture of a known circuit for supplying a DC voltage to a device RL. The power is taken from an AC voltage source and converted into an uncontrolled or fluctuating (ripple affected) DC voltage by a rectifier module G. The AC voltage is fed to the input terminals of the rectifier module G. One of the connecting lines, or both connecting lines, of the rectifier module G to the external terminals EA of the circuit includes a 50 Hz coil 50 for smoothing purposes. The DC voltage can be tapped from the output terminals "+", "−" of the rectifier module G by the device RL. The two output lines to these terminals are coupled via a smoothing capacitor C. Furthermore, an output line often includes a resistor R to achieve a limitation of the switch-on current.

Figure 3:
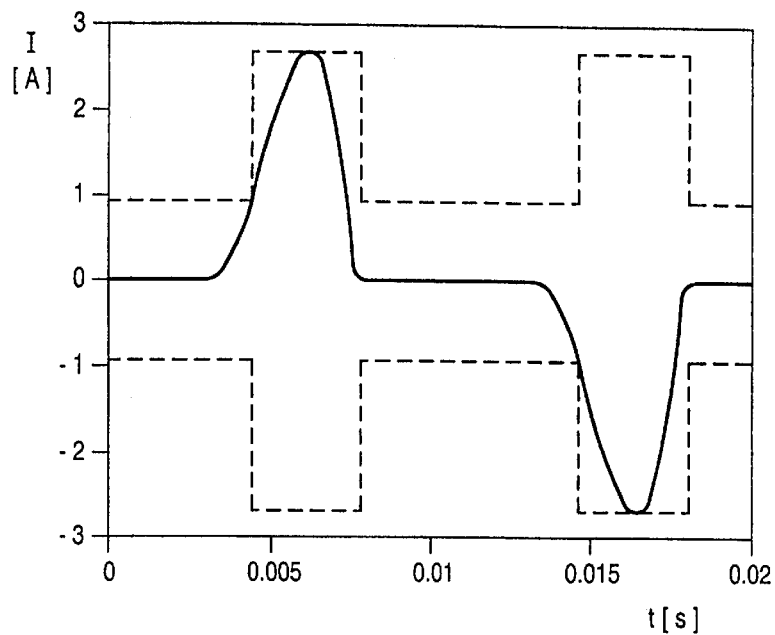
FIG. 3 shows the curve of the power consumption in either of the known circuits shown in FIG. 1 or 2.

The curved pattern of the power consumption resulting from the circuit shown in FIG. 1 or FIG. 2, respectively, is shown in FIG. 3, where the circuit is based, for example, on the following parameters: R=1.5 Ohms, L50 =−32 mH, C=22 $\mu$F, Uin=230 V, f=50 Hz, Po=145 W.

Figure 4:
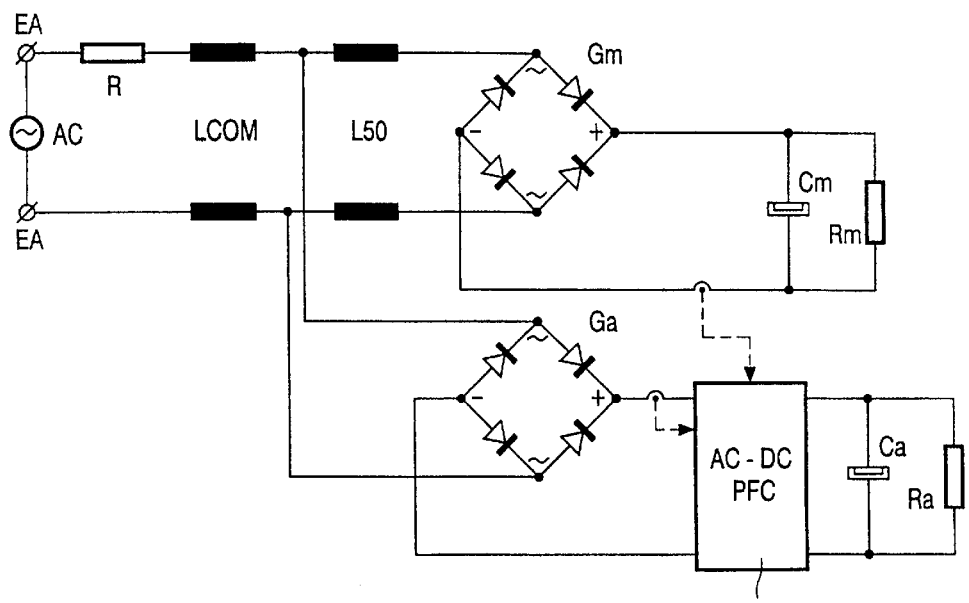
FIG. 4 shows a circuit according to the invention with two devices.

FIG. 4 shows a circuit according to the invention for supplying power to two devices Rm, Ra. In this circuit, there are two different paths through which energy is drawn from the AC voltage (line power supply) present on the external terminals EA. The first path leads through the first rectifier module Gm (m="main"), and the second path leads through the second rectifier module Ga (a="aux"). Only the first path leads on the input side of the first rectifier module Gm through a 50 Hz coil L50, while the auxiliary line for the second path is tapped before the 50 Hz coil L50.

While the output path via the rectifier module Gm utilizes the conventional configuration of diode bridge and electrolyte capacitor Cm, the power for the second path is actively rendered available by means of the sinusoidal current. This may be effected via a switched-mode power supply 10 (also called AC/DC converter or PFC) such as, for example, an up-converter (boost converter) or a flyback converter, which is arranged between the rectifier module Ga and the device Ra. The first path, which includes the rectifier module Gm, then preferably renders the larger power available. However, the first path could also process the smaller power.

Figure 5:
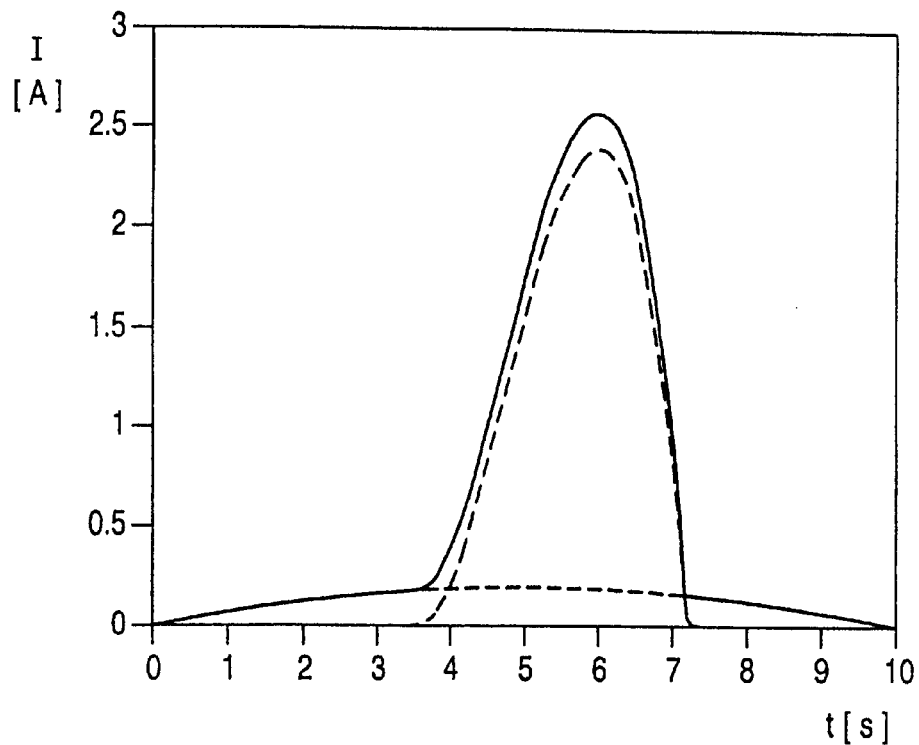
FIG. 5 shows the curve of the power consumption in the circuit shown in FIG. 4 when the AC/DC converter is operated with sinusoidal current.

FIG. 5 shows the resulting signal curve of the power consumption on the external terminals EA (50 Hz input current, a half-wave) when the circuit according to FIG. 4 is used, if the power for the device Ra is rendered available via a sinusoidal current flowing through the rectifier module Ga. The resulting form of the curve of the input current (solid line) consists of two parts, that is to say, the current flowing through the first rectifier module Gm (dashed line) and the current flowing through the second rectifier module Ga (dotted line). The main recharge pulse is limited by the large 50 Hz coil L50.

Figure 6:
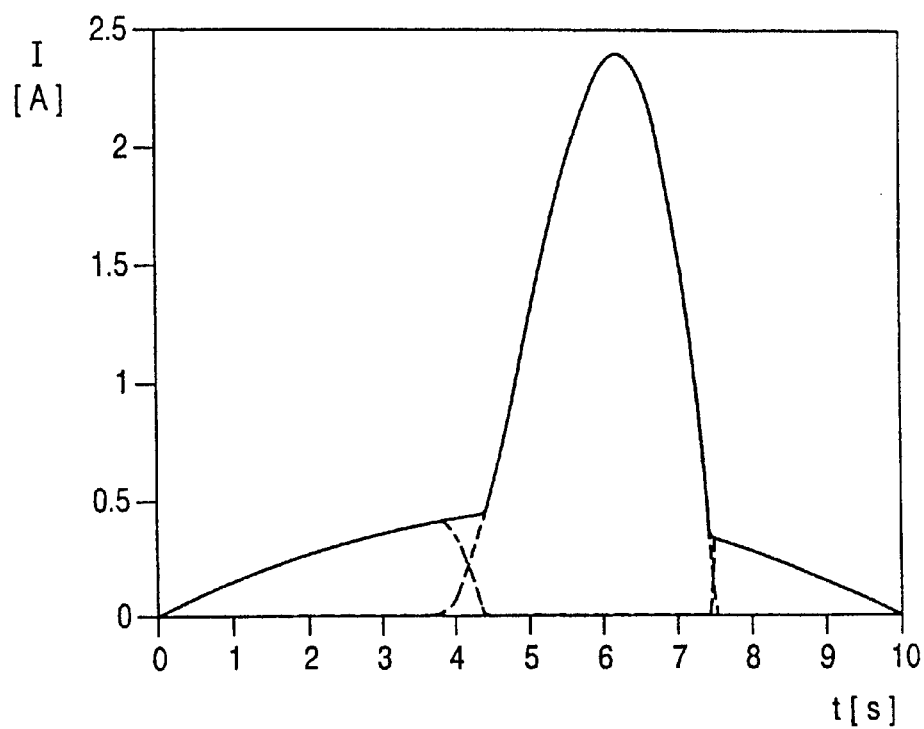
FIG. 6 shows the curve of the power consumption of the circuit shown in FIG. 4 when the AC/DC converter is operated when part of the recharging current pulse is used.

FIG. 6 shows the resulting signal curve of the power consumption on the external terminals EA (50 Hz input current, a half-wave) when the circuit shown in FIG. 4 is used, if the power for the device Ra is not tapped as a purely sinusoidal power, but part of the recharge pulse is used to form as sinusoidal an input current as possible. The resulting form of the curve of the input current (solid line) again consists of two parts, the current flowing through the first rectifier module Gm (dashed line) and the second rectifier module Ga (dotted line). When the recharge pulse begins, the current consumption is reduced by the second rectifier module Ga until the power consumption becomes negative (which is not possible because of the rectifier module Ga). For this purpose, the recharge pulse is to be detected in the upper circuit. This may be effected according to present day current sensor principles.

In the examples on which FIGS. 5 and 6 are based, the coil L50 can be reduced by a factor of 2 compared to the state of the art (with $L \times I^2/2$ as an approximate value for the size of the coil).

In all proposals, non-linear magnets may be used for further reduction of the size of the magnetic components.

List of reference characters in the drawings:

| | |
|---|---|
| AC | AC voltage source |
| C | smoothing capacitor |
| Ca | capacitor in the second input path |
| Cm | capacitor in the first input path |
| EA | external terminal |
| Gm | rectifier in the first input path (main) |
| Ga | rectifier in the second input path (aux) |
| I | current |
| L50 | 50 Hz coil |
| Lcom | current inductance |
| R | ohmic resistance |
| RL | device |
| Rm, Ra | devices in the first/second input path |
| t | time |

What is claimed is:

1. A circuit for converting AC voltage into DC voltage for at least one device, comprising:

two external input terminals supplying an AC voltage;

a first rectifier module having two inputs connected via connection lines to the two external input terminals, and two output lines with external output terminals for coupling said circuit to at least one device; and at least one induction coil arranged in one of the connection lines between the external input terminals and the first rectifier module, characterized in that said circuit further comprises at least a second rectifier module having two inputs connected, respectively, to the external input terminals while bypassing the induction coil, and two output lines for connecting to at least one further device, the output lines including a switched-mode power supply arranged between the second rectifier module and the at least one further device to be connected.

2. The circuit as claimed in claim 1, characterized in that the switched-mode power supply operates with a substantially sinusoidal current.

3. The circuit as claimed in claim 1, characterized in that the switched-mode power supply is an up-converter or a flyback converter.

4. The circuit as claimed in claim 1, characterized in that the switched-mode power supply utilizes part of the recharge pulse to extract as sinusoidal a current as possible at the two external terminals.

* * * * *